Oct. 20, 1925.
J. C. BOSS ET AL
PIPE COUPLING
Filed June 27, 1924
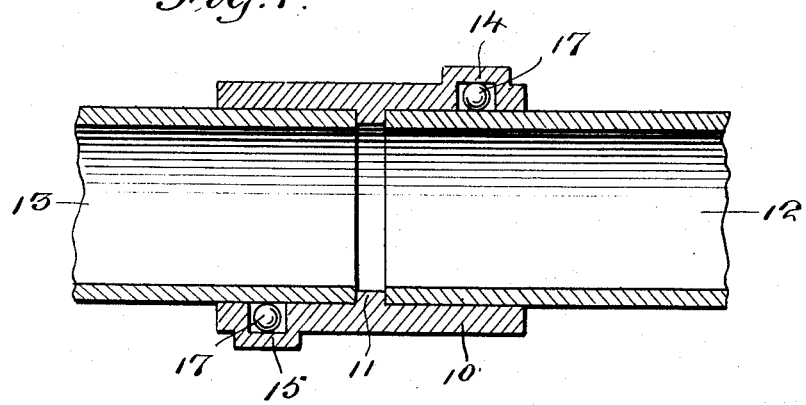
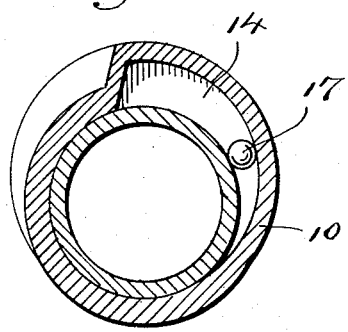
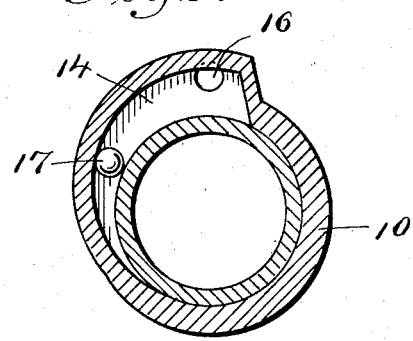
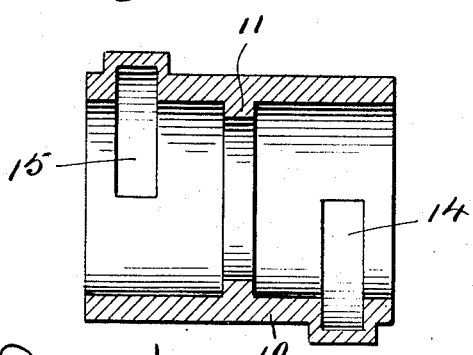
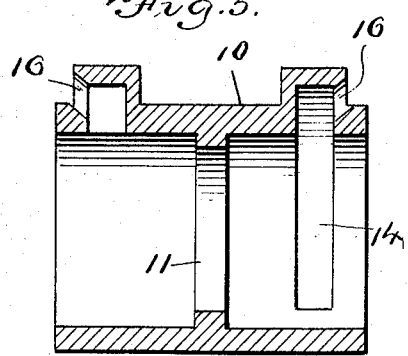
J. C. Boss
R. F. Boss INVENTOR Patented Oct. 20, 1925.

1,558,334

UNITED STATES PATENT OFFICE.

JOHN C. BOSS AND RUDOLPH F. BOSS, OF WESTERVILLE, OHIO.

PIPE COUPLING.

Application filed June 27, 1924. Serial No. 722,776.

*To all whom it may concern:*

Be it known that we, JOHN C. Boss and RUDOLPH F. Boss, citizens of the United States, residing at Westerville, in the county of Franklin and State of Ohio, have invented new and useful Improvements in Pipe Couplings, of which the following is a specification.

This invention relates to pipe couplings, and contemplates a structure primarily intended for coupling the adjacent ends of pipes, where the installation does not require a water proof fitting, the coupling being designed to frictionally hold the pipes connected together, thereby eliminating the necessity of cutting threads at each connection.

More specifically stated, the invention comprehends a coupling sleeve formed to provide a cam like pocket or recess communicating with the bore of the sleeve, and adapted to receive a ball which when the pipe is turned within the sleeve impinges between the pipe and wall of the recess to retain the parts associated.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a longitudinal sectional view through the pipe coupling,

Figure 2 is a transverse sectional view showing the position of the ball when one of the pipes is coupled within the sleeve, Figure 3 is a similar view showing how the other pipe is coupled.

Figure 4 is a longitudinal sectional view through the coupling sleeve,

Figure 5 is a similar view taken on a different line.

Referring to the drawings in detail, 10 represents the coupling sleeve which may be of any suitable size without departing from the spirit of the invention, and formed with an internal flange 11 arranged at a point midway between the ends of the sleeve. This flange forms an abutment for the adjacent ends of the pipe sections 12 and 13 respectively. This sleeve 10 at substantially diametrically opposite points and adjacent the opposite ends thereof is formed with cam shaped pockets or recesses 14 and 15 respectively, the walls of these pockets projecting outwardly from the sleeve, but which recesses or pockets open into the bore of the sleeve. The pockets extend in opposite directions about the sleeve, and have their inner extremities terminating substantially in a plane with the longitudinal center of the sleeve as clearly shown in Figure 7. Each pocket has an opening 16 formed in one side thereof to permit of the insertion of a ball 17, there being one of these balls used in each pocket or recess.

In practice each pipe is singly coupled to the sleeve, pipe 12 being inserted into one end of the sleeve until it abuts the flange 11, after which one of the balls 17 is passed into the pocket 14. Then it is only necessary to turn the pipe a short distance in order to cause the ball 17 to occupy the position shown by full lines in Figure 6, in which position the ball is impinged between the pipe and the wall of the pocket, thereby holding these parts effectively coupled together. The pipe 13 is then slipped into the other end of the sleeve until it abuts the flange 11 and the same operation repeated. Manifestly, the invention provides means whereby the adjacent ends of pipes can be quickly and conveniently connected together, and without the necessity of cutting threads on the coupling end of the pipes.

While it is believed that from the foregoing description, the nature and advantages of the invention will be readily apparent, we desire to have it understood that we do not limit ourselves to what is herein shown and described, and that such changes may be resorted to when desired as fall within the scope of what is claimed.

We claim:

A coupling for connecting the adjacent ends of two pipes, said coupling comprising a sleeve adapted to receive said pipes, an internal annular flange arranged centrally of said sleeve and adapted to be engaged by the adjacent ends of said pipes, cam shaped pockets arranged adjacent the opposed ends of said sleeve, the walls of each pocket projecting outwardly from said sleeve at one end and merging into the wall of the sleeve at the other end, and one side wall of each pocket having an opening therein, whereby a ball may to be inserted in the pocket through said opening after the pipes have been associated with said sleeve for the purpose specified.

In testimony whereof we affix our signatures.

JOHN C. BOSS.
RUDOLPH F. BOSS.